Patented May 16, 1944

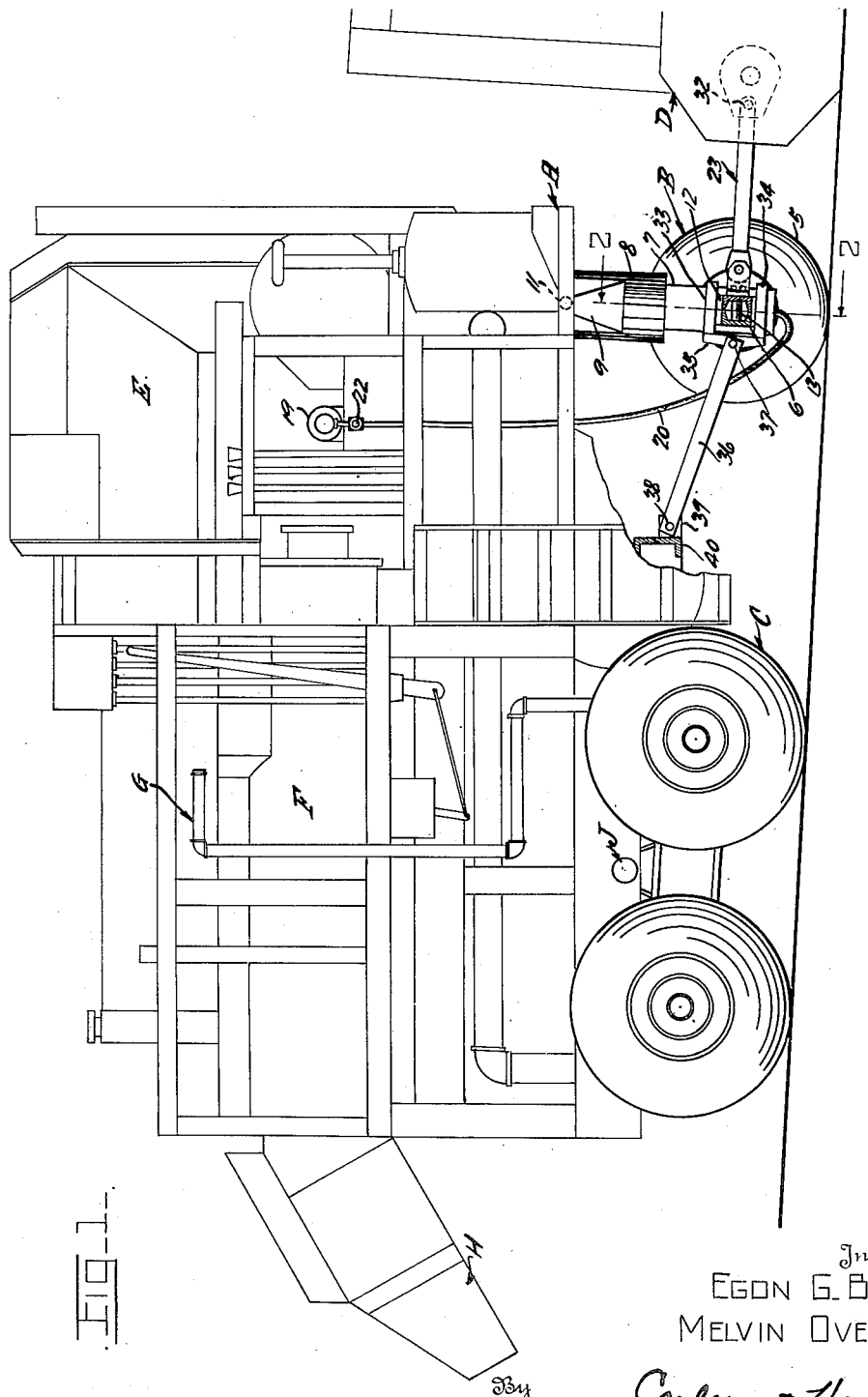

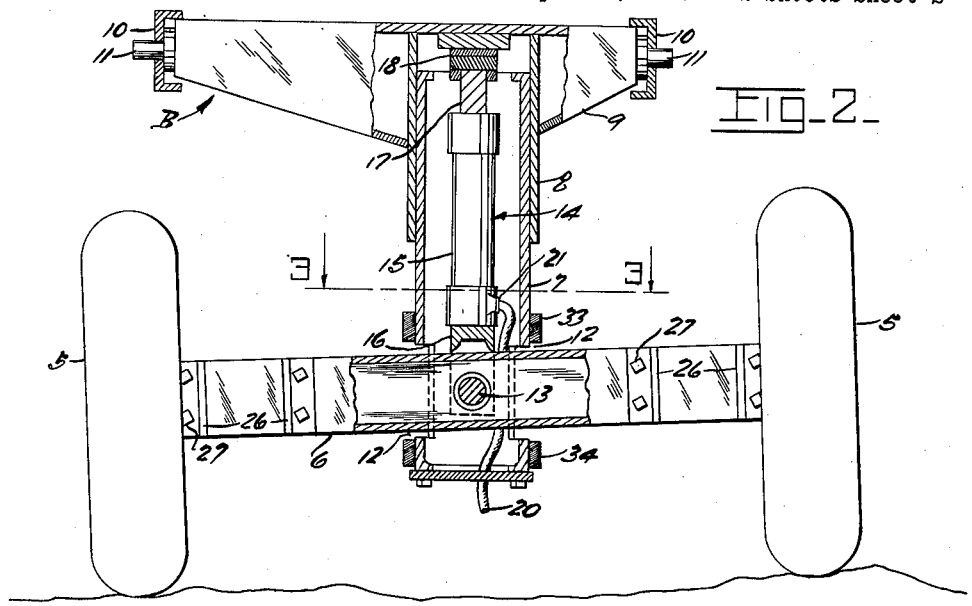
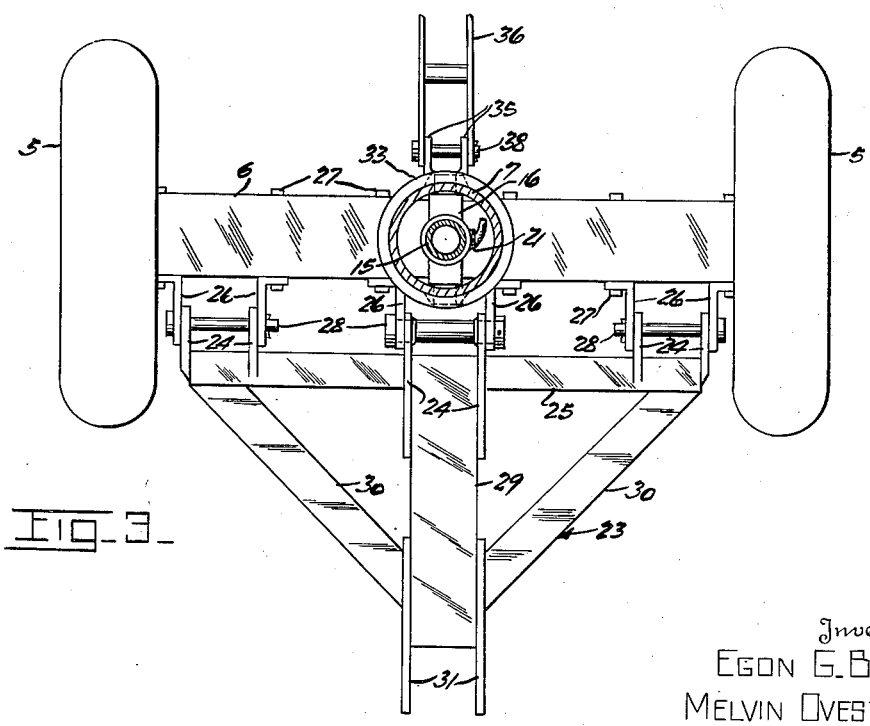

2,348,879

UNITED STATES PATENT OFFICE 2,348,879

HYDRAULIC LEVEL CONTROL FOR MIXING MACHINES

Egon G. Berg, and Melvin Ovestrud, Minneapolis, Minn., assignors to Pioneer Engineering Works, Inc., Minneapolis, Minn., a corporation of Delaware Original application September 21, 1940, Serial No. 357,708. Divided and this application October 13, 1941, Serial No. 414,708

11 Claims. (Cl. 280—6)

This invention relates generally to improvements in machines for mixing road building materials such as composed of an aggregate and a bituminous binder.

The kind of machine here in mind is that which employs a wheeled frame upon which the mixing mechanism is mounted and which may be transported on the road by a tractor, or other draft vehicle, to prepare and deposit the mixed building material continuously along the road. Such a machine when thus used of course must operate with equal facility on inclined or sloped road surfaces which it will frequently meet and inasmuch as the mixing mechanism is usually of a type requiring a substantially level position to ensure an even and continuous feed of constant volume it is obvious that some means for leveling the frame is required.

Our present invention therefore has as its primary object the provision of a means whereby the frame, carrying the mixing mechanism and associated parts, may be raised or lowered at one end with respect to the supporting wheels to thus permit the frame to be maintained in a level condition, no matter what the inclination of the road surface may be.

Another and important object is to provide for a machine of this kind a novel and advantageous form of supporting truck for one end of the frame and embodying a hydraulic jack for raising and lowering the frame with respect to the truck. Another object is to provide for the truck a central bearing and support in the form of two telescoping, tubular members which not only provide a bearing about which dirigible steering movements may be had, but which also serve to entirely enclose, protect and conceal the hydraulic jack used for leveling purposes. Still another object is to provide an adjustable leveling and supporting truck having improved draft connections and draft transmission features and in which the wheel supported axle is arranged for rocking movements to largely absorb and compensate for minor road surface irregularities and further prevent disadvantageous displacements of the frame.

These and other more detailed and specific objects will be disclosed in the course of the following specification, reference being had to the accompanying drawings, in which—

Fig. 1 is a side elevation of a mixing machine embodying our invention, the near wheel of the adjustable truck being removed and certain parts shown in longitudinal, vertical section to better disclose the construction.

Fig. 2 is an enlarged vertical cross section taken substantially along the line 2—2 in Fig. 1.

Fig. 3 is a horizontal cross section along the line 3—3 in Fig. 2.

This application is a division from our co-pending application for United States Patent on a Mixing machine, Serial No. 357,708, filed September 21, 1940, now Patent No. 2,297,867, issued October 6th, 1942, and reference to such patent is invited for a complete disclosure of mixing and feeding mechanisms and associated parts. Only such parts as pertinent to the present invention are herein shown and described.

Referring now more particularly and by reference characters to the drawings, A represents generally the frame of our mixing machine which is mounted for transport upon front, and rear, wheeled trucks B and C and upon which various mixing, pumping and feeding mechanisms are operatively arranged. The machine is transported usually behind a combined tractor and loader, only a fragment of which is shown at D, and which operates to pick up a granular road material, such as an aggregate, from a windrow on the road and deliver this material in a constant stream to a hopper E. From this hopper the material is fed at a controlled rate to a pug mill F and is then sprayed with a binder, such as a bituminous oil, by spray pipes G. The material is carried rearwardly in the pug mill F as it is mixed and is delivered or deposited on the road from the chute H at the rear end. Obviously the machine must be nearly level, in the longitudinal direction, if gravity is not to influence and vary the rate of feed, mixing and discharge of the material and it is very important to have these operations proceed at an even rate. In the traveling machine this is somewhat difficult since it frequently will meet with inclines or sloped road surfaces, and even in a fixed plant installation it is sometimes necessary to set up on an inclined surface.

In accordance with our invention leveling means is provided in the front truck B as will now be set forth. Said truck also has other novel details and advantageous features of construction which, while not directly used for leveling, nevertheless contribute to stability of the machine as a whole and therefore are important and a part of the present invention.

The truck B includes two transversely spaced wheels 5 which are journaled at the ends of a tubular axle 6. This axle is arranged for dirigible swinging movements in a substantially horizontal plane for steering purposes and to this end the axle extends through the lowermost of two telescopically and rotatably engaged cylinders or sleeves 7 and 8. The upper cylinder 8 is rigidly affixed, as by welding or other suitable means, to a bolster member 9 which extends transversely between longitudinal beams 10 of the frame A. The ends of the bolster carry laterally extending pins 11 which journal through the beams 10 to permit forward and rearward swinging movements of the entire truck for a purpose to be described.

The above engagement between the cylinders 7 and 8 will obviously permit the necessary steering movements of the truck and in addition the axle 6 extends loosely through openings 12 in the lower cylinder and is pivoted on a horizontal pin 13 which is extended diametrically through said lower cylinder. Not only does this pin transmit the weight of the machine to the axle, and thence to the wheels, but it also permits the axle to swing upwardly and downwardly at its ends with respect to the frame (see Fig. 2) to prevent displacement or lateral canting of the machine by minor road surface irregularities or "banking" of the road.

Arranged wholly within the cylinders 7—8 is a hydraulic jack 14 comprising a cylinder 15, which may be supported by an inverted U-shaped bracket 16 pivotally engaged with the pin 13, and a plunger 17 connected at an upper end 18 with the bolster 9. Fluid from a pump 19, or other supply means, is supplied under pressure to the cylinder through a flexible tube or hose 20 connected at 21 to the cylinder and under control of a valve 22.

It is apparent that by admitting fluid to the jack it may be extended between the axle 6 and bolster 9 to thereby raise the frame with respect to the axle, and by exhausting the fluid from the jack it may be collapsed to lower the frame. In such operation the cylinders 7 and 8 extend or collapse in the vertical direction as required and without in any way interfering with steering connections and movements of the truck.

The upward and downward movements of the front end of the frame A as thus secured make it possible to level it in the longitudinal direction as required by an inclination of the road surface. In furtherance of such operation the rear truck C is pivoted on a transverse horizontal axis at J to permit the necessary tilting of the frame at its rear end also.

Draft connection to the truck B in accordance with our invention is made through a tongue member 23 having three transversely spaced pairs of apertured pivot ears 24, at the rear of its main cross bar 25. These ears are set astraddle corresponding pairs of apertured brackets 26 secured by bolts 27 to the forward side of the axle 6 and pivot pins 28 are extended horizontally and transversely through the ears and brackets as clearly shown in Fig. 3. The center member 29 of the tongue, braced to bar 25 by diagonal braces 30, has pivot lugs 31 at its forward end by which pivot connection is made at 32 to the draft vehicle or tractor D. Flexibility for relative upward and downward movements of the mixing machine with respect to the tractor is thus provided.

The draft forces transmitted to the axle, instead of being carried to the frame through the cylinders 7—8 and bolster 9, are brought directly to the frame by means now to be described. Draft rings or annular bands 33 and 34 are journaled on the lower cylinder 7 respectively above and below the axle 6 and clear of the openings 12, and at their rear sides these rings are rigidly connected by spaced and upright bracket members or flanges 35. A draw bar or radius arm 36 is pivoted at a forward end on a horizontal axis to these members 35 by a pin 37 and extends upwardly and rearwardly to a point at which its rear end is pivoted by a pin 38 between brackets 39 secured to a cross beam 40 of the frame A. Obviously the draft forces or pull will thus be transmitted directly to the frame through the rings 33—34 and bar 36, freeing the bolster 9 of any bending stresses. The cylinders 7 and 8 may, however, swing forward or rearward the small amount necessary to compensate for upward and downward movements of the bar 36 (when levelling the machine) by virtue of the pivot connections at 11.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a vehicle, a frame, ground wheels supporting the rear end of the frame, a steerable truck having ground wheels supporting the front end of the frame, said truck including an axle, a pair of telescopically and rotatably arranged tubular members disposed in an upright position with the uppermost member pivotally connected to the frame and the lowermost member connected to the axle, a radius member connecting the lowermost member with the frame, and a hydraulic jack arranged within said members and operative to raise and lower the frame with respect to the axle.

2. In a vehicle, a frame, front and rear wheel borne trucks arranged beneath the ends of the frame to transport the same, one of said trucks including an axle, a vertically slidable connection between the axle and frame and comprising tubular members telescopically and rotatably assembled to permit steering movements of the axle and truck about a generally upright axis, and transversely pivoted to the frame for limited oscillation in a vertical longitudinal plane, and a jack arranged within the said tubular members to support the end of the frame, said jack being operative to raise and lower the frame with respect to the axle.

3. In a vehicle, a frame supported for travel movement in part by a steerable wheel borne truck, said truck including an axle having ground wheels at its ends, an upright steerable connection comprising a pair of telescopically and rotatably connected cylinders, the upper cylinder being pivotally and oscillatably connected to the frame and the lower cylinder having a supporting connection with the axle, means for controlling the oscillating movement of the cylinders on the pivotal connection, a jack arranged in an upright position within said cylinders to transmit load forces to said axle, said jack being operative to raise and lower the frame with respect to the axle, and said supporting connection between the lower cylinder and axle comprising a horizontal pivot means permitting upward and downward swinging movements of the wheel supported ends of the axle with respect to the frame.

4. In a vehicle, a frame supported for travel movement in part by a steerable wheel borne truck, said truck including an axle having ground wheels at its ends, an upright steerable connection comprising a pair of telescopically and rotatably connected cylinders, the upper cylinder being connected to the frame and the lower cylinder having a supporting connection with the axle, a jack arranged within the cylinders and operative to vertically adjust the frame with respect to the axle, said lower cylinder having openings in its walls to loosely pass the axle, and the said supporting connection between this cylinder and axle comprising a pin extending horizontally through the cylinder and axle and permitting upward and downward movements of the wheel supported ends of the axle with respect to the frame.

5. In a vehicle, a frame having a front steering truck, said truck comprising an axle, ground wheels at the end of the axle, an upright steerable member connecting the axle and frame and permitting relative vertical movements therebetween, said member having freedom for limited fore and aft movement at its lower end, a jack arranged to raise and lower the frame with respect to the axle, a draft connection to the axle, and means for transmitting draft forces directly from said axle to the frame comprising a radius member connected between a lower end portion of said steerable member and a rear and relatively upwardly located part of the frame.

6. In a vehicle, a frame having a front steering truck, said truck comprising an axle, ground wheels at the end of the axle, an upright steerable member connected at a lower end to the axle and at an upper end pivoted to the frame for forward and rearward swinging movements with respect to the frame, said lower end connection permitting relative upward and downward movements of the axle and frame, a jack arranged to raise and lower the frame with respect to the axle, a bearing ring on the lower end portion of said steerable member, and a radius member pivotally connected between the said bearing ring and a point on the frame spaced rearwardly and upwardly therefrom.

7. In a vehicle, a frame supported for travel movement in part by a steerable wheel borne truck, said truck including an axle having ground wheels at its ends, an upright steerable connection comprising a pair of telescopically and rotatably connected cylinders, the upper cylinder being connected to the frame and the lower cylinder having a supporting connection with the axle, a jack arranged within the cylinders and operative to vertically adjust the frame with respect to the axle, a draft tongue connected to the axle for transmitting draft forces thereto, bearing rings rotatably engaging the lowermost cylinder respectively above and below the axle, means rigidly connecting said bearing rings at the rear of the cylinder, a radius member pivotally connected to said ring connecting means and extending upwardly and rearwardly therefrom, and means connecting the rear end of the radius member to the frame.

8. In a steering truck assembly for a vehicle having a frame, said truck comprising a wheel supported member, an upright steerable member connected at a lower end to said wheel supported member and at an upper end pivotally connected to the frame for limited fore and aft movement at its lower end, said steerable member being capable of up and down movements to raise and lower the frame with respect to the wheel supported member, draft means connected to said wheel supported member, and means for transmitting draft forces from the wheel supported member to the frame, said means comprising a radius member connected between the steerable member and an adjacent part of the frame.

9. In a vehicle having a frame and a steering truck supporting one end thereof, said truck including a wheel supported axle, an upright steering member connecting the axle and frame and permitting relative up and down movements therebetween, said member being pivoted at its upper end to permit fore and aft adjustment at its lower end, means for raising and lowering the frame with respect to the axle, a draft device connected to the axle, bearing means rotatably connected to said steering member, and a radius member connected between said bearing means and a rigid part of the frame for transmitting draft forces from the axle directly to the frame.

10. In a steering truck assembly of the character described for supporting one end of a frame, a wheel supported axle, upper and lower collapsibly connected members, the lower member being connected to the axle, the upper member being supportably connected to the frame, means for extending and collapsing said upper and lower members for raising and lowering the frame with respect to the axle, a draft device connected to the axle, a radius member extending in a generally longitudinal direction and pivotally connected at its ends between said lower member and a part of the frame to transmit draft forces to the frame while permitting up and down adjustments of said upper and lower members as the frame is raised and lowered, and said upper member having pivotal connection with the frame about a transverse pivot axis.

11. In a vehicle, a frame supported for travel movement in part by a steerable wheel borne truck, said truck including an axle having ground wheels at its ends, an upright steerable connection comprising a pair of telescopically and rotatably connected cylinders, the upper cylinder being connected to the frame, a horizontal pivot pin in the lower cylinder, said axle being pivoted on said pin to permit up and down movements of the wheel supported ends of the axle, a jack arranged in the cylinders and connected at an upper end to the upper cylinder, a bracket supporting the lower end of the jack, and said bracket being connected to said pivot pin to transmit load forces from frame to axle, and said jack being adjustable to raise and lower the frame with respect to the axle.

EGON G. BERG.
MELVIN OVESTRUD.